United States Patent [19]

Feldner

[11] Patent Number: 5,090,725
[45] Date of Patent: Feb. 25, 1992

[54] COLLAPSIBLE GARMENT CART

[76] Inventor: Robert H. Feldner, 3666 E. Olympic Blvd., Los Angeles, Calif. 90023

[21] Appl. No.: 564,726

[22] Filed: Aug. 6, 1990

[51] Int. Cl.⁵ .............................................. B62B 3/02
[52] U.S. Cl. .................................. 280/651; 211/189; 280/47.35; 280/79.3; 280/659
[58] Field of Search ............... 280/651, 659, 639, 641, 280/39, 47.35, 79.3; 211/189, 195, 204

[56] References Cited

U.S. PATENT DOCUMENTS

| | | | |
|---|---|---|---|
| 1,510,272 | 9/1924 | Harmount | 211/204 |
| 2,793,764 | 5/1957 | Stork | 211/204 |
| 2,852,145 | 9/1958 | Scholz | 211/204 |
| 3,146,892 | 9/1964 | White | 211/204 |
| 3,507,402 | 4/1970 | Barbee | 211/204 |

FOREIGN PATENT DOCUMENTS

| | | | |
|---|---|---|---|
| 1429831 | 10/1969 | Fed. Rep. of Germany | 211/204 |
| 2521394 | 11/1976 | Fed. Rep. of Germany | 211/204 |
| 3737532 | 1/1989 | Fed. Rep. of Germany | 280/79.3 |
| 1581331 | 9/1969 | France | 280/651 |

*Primary Examiner*—Andres Kashnikow
*Assistant Examiner*—Eric Culbreth
*Attorney, Agent, or Firm*—Allan M. Shapiro

[57] ABSTRACT

The collapsible cart of this invention has a base frame on which are mounted wheels, at least two of which are casters. A lower end frame is pivotally mounted to the base frame at each end thereof. An upper end frame is telescopically mounted in each of the lower end frames to rise to a predetermined position and detachably lock in the raised position. A cross bar is pivotally mounted on one of the upper end frames and detachably mounted at the top of the other upper end frame. The structure is such that detachement, folding and locking are achieved to change the collapsible cart from a garment hanger type to a very small, low folded unit.

9 Claims, 3 Drawing Sheets

FIG. 1
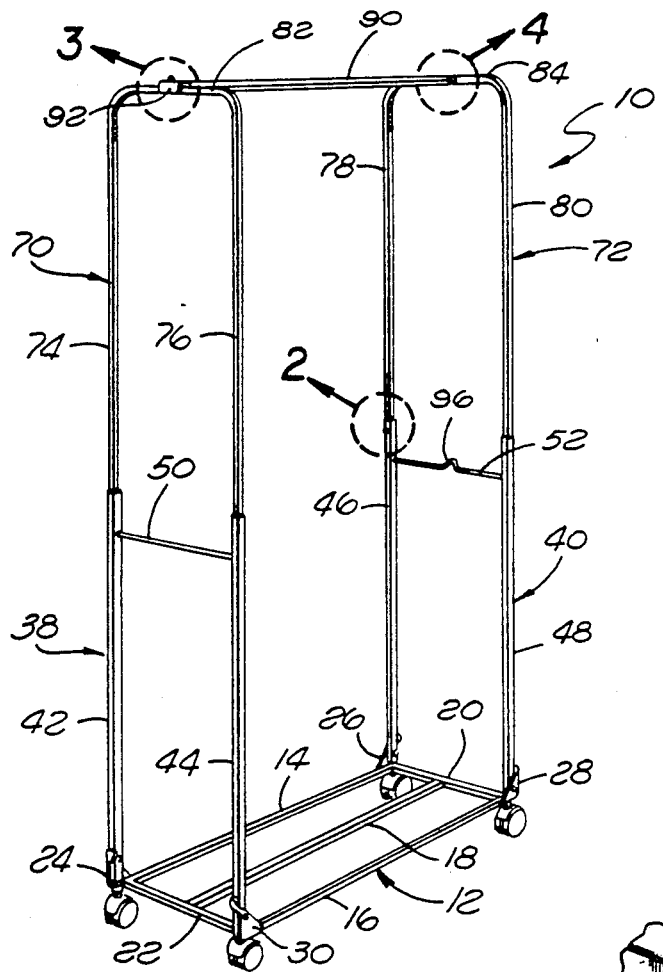
FIG. 2
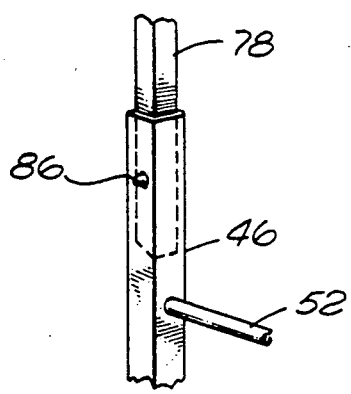
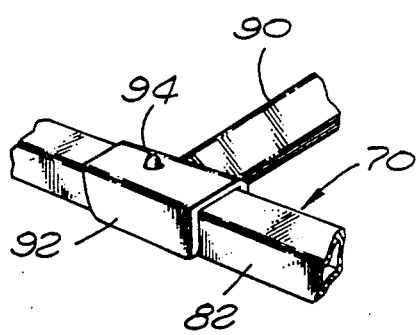
FIG. 3
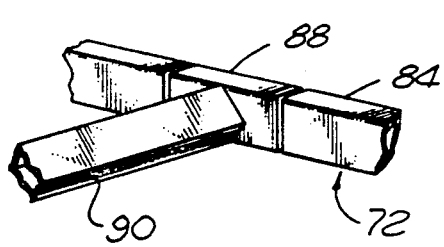
FIG. 4

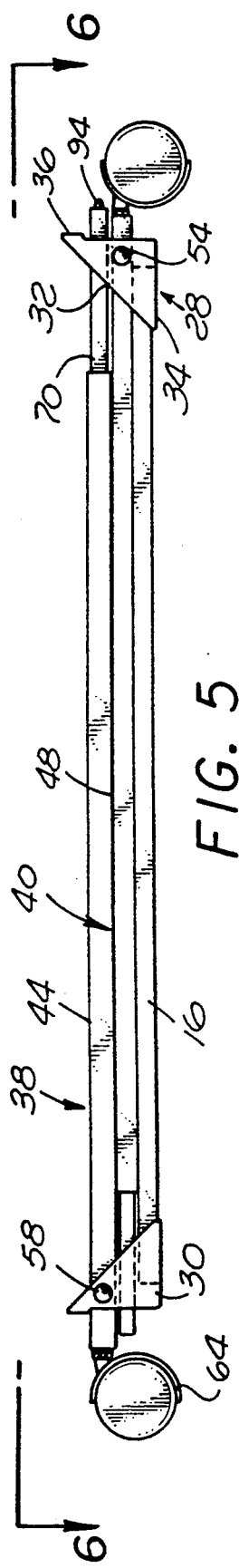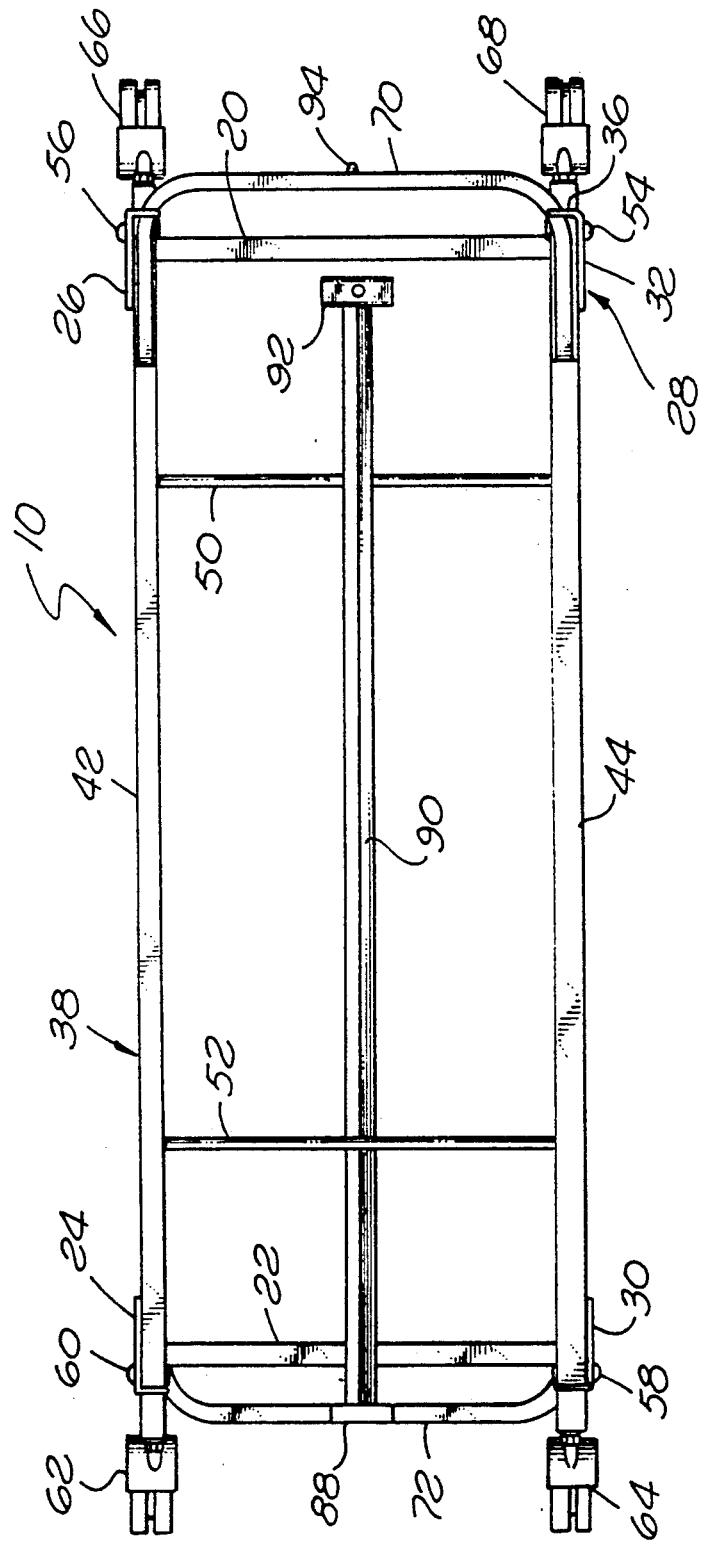

COLLAPSIBLE GARMENT CART

FIELD OF THE INVENTION

This invention is directed to a collapsible cart which can be interchanged from a folded, compact structure to a raised, extended structure capable of carrying suitcases and hanging garment bags.

BACKGROUND OF THE INVENTION

In traveling, it is often necessary to carry one's baggage from place to place without benefit of porters or carts. Accordingly, many travelers find it desirable to carry their own cart with them. The carts available on the market are able to carry only a few pieces of baggage and are not capable of carrying hanging garment bags. Once the cart is no longer needed for transport of the baggage, it should be easily convertible into a compact state. The small carts available on the market are foldable in such a way, but the carts which are capable of carrying more suitcases and which have a rail from which a garment bag can be hung are not arranged for folding to a compact state. Thus, there is need for a larger baggage cart for carrying more baggage and more diverse baggage, but also for providing such a cart which can be folded into a compact condition so that it can be carried along.

SUMMARY OF THE INVENTION

In order to aid in the understanding of this invention, it can be stated in essentially summary form that it is directed to a collapsible cart which has a base frame with wheels thereunder. First and second lower end frames are pivotally mounted on the base frame to swing from a lowered position lying thereagainst to a raised position. Upper telescoping end frames are telescopically mounted in the lower end frames, and a hanging bar stabilizes the upper ends of the telescoping end frames and also provides for hanging thereon of baggage or clothing on hangers.

It is, thus, an object and advantage of this invention to provide a collapsible cart which is foldable from a compact condition to an unfolded, raised position wherein in the raised position, it has a hanging bar thereacross sufficiently high to hang garments and garment bags therefrom.

It is another object and advantage of this invention to provide a collapsible cart which can carry a plurality of baggage units, including hanging baggage, and which can also provide for folding of the cart into a compact condition so that it can be carried along.

It is a further object and advantage of this invention to provide a collapsible cart which locks in the folded position.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a perspective view of the collapsible cart of this invention in the erected position.

FIG. 2 is an enlarged portion of the end frames showing the telescoping thereof, as seen generally at detail 2 of FIG. 1.

FIG. 3 shows the manner in which the hanging bar detachably locks to the telescoping upper end frame, as seen at detail 3 in FIG. 1.

FIG. 4 is an enlarged detail showing the manner in which the hanging bar is attached at the other telescoping end frame, as shown at detail 4 in FIG. 1.

FIG. 5 is a side view of the collapsible cart in the folded position.

FIG. 6 is a plan view of the cart in the folded position.

DESCRIPTION OF THE PREFERRED EMBODIMENT

Figure 7:
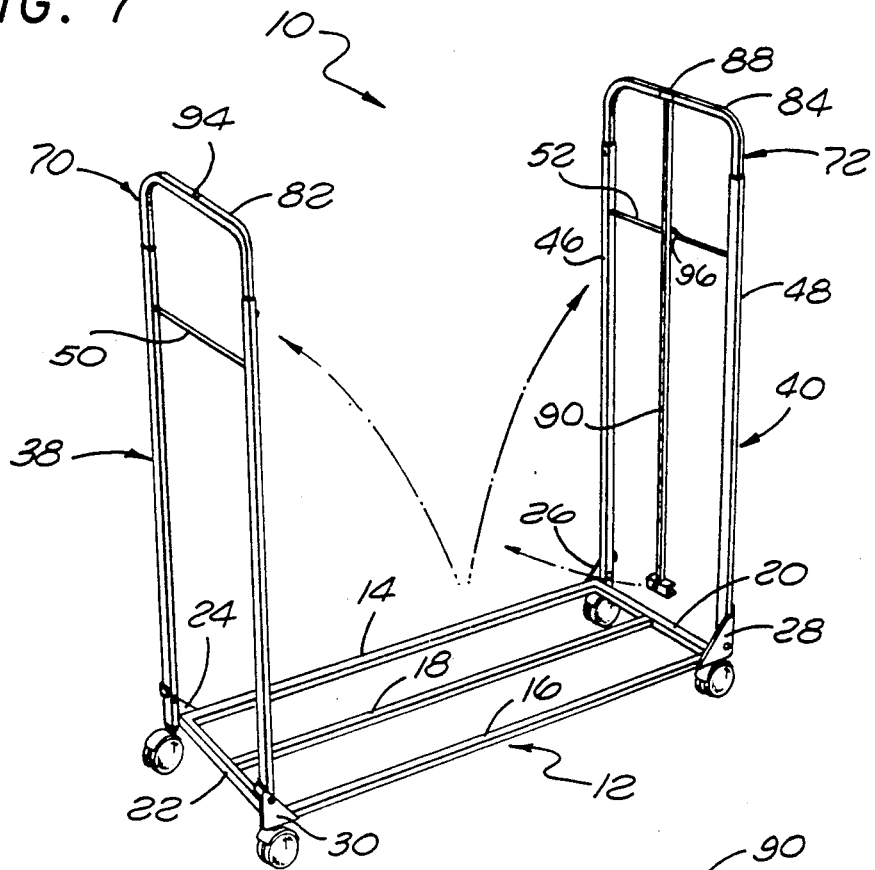
FIG. 7 is a perspective view of the cart after the first two steps in raising it from the folded position, showing the end frames raised.

The collapsible cart of this invention is generally indicated at 10 in FIGS. 1, 5, 6, 7 and 8. The collapsible cart 10 is configured so that it can be erected to carry suitcases and other travel items, as shown in FIG. 1, and can be folded into a configuration where it is easily hand-carried, as shown in FIGS. 5 and 6. The cart 10 has a base frame 12 which has left and right rails 14 and 16, as well as center rail 18. The rails are fixed at each end to end bars 20 and 22. The rails and end bars of the base frame are preferably tubular to provide adequate rigidity at minimum weight. Square tubular aluminum tubing is preferable. The rails and bars are permanently secured together, as by welding, to form a rigid and strong base frame.

Pivot brackets 24, 26, 28 and 30 are fixed to the four corners of the base frame. The four pivot brackets are the same, except brackets 26 and 28 are mirror images of the brackets 24 and 30. The bracket 28 will be described in detail, in particular with respect to FIGS. 5 and 6. It is understood that the other brackets are identical or mirror image. Bracket 28 has a triangular side panel 32 which has a foot 34 thereunder, which extends under the end of right rail 16. This foot provides for strong attachment to bear on the under surface and outside surface of the side rail 16. Similarly, integrally formed with the triangular side panel and inwardly bent with respect thereto is stop 36. Stop 36 extends inward with respect to the base frame, and the stops on opposite pivot brackets are directed toward each other, as best seen in FIG. 6. The stop 36 is positioned above the right side rail 16 for purposes described below.

Front lower end frame 38 and back lower end frame 40 are seen in FIGS. 1, 5, 7 and 8. The two lower end frames are identical, except for being attached to opposite ends of the base frame. Lower end frame 38 has left and right tubes 42 and 44, while back lower end frame 40 has left and right tubes 46 and 48. These tubes of the lower end frames are held in spaced relationship by means of cross braces 50 and 52 and are respectively pivoted to pivot brackets 24 through 30. As is seen in FIGS. 5 and 6, pivot pin 54, in the form of a bolt, extends through pivot bracket 28 in the lower end of the right tube of the back lower end frame. A similar pivot pin 56 (see FIG. 6) extends through pivot bracket 26 and the left tube of the back lower end frame. The pivot pins are located so that, when the back lower end frame is folded down against the base frame, as shown in FIG.

5, it lies thereagainst and parallel thereto. In a similar way, the front lower end frame 38 is pivoted on pivot pins 58 and 60 so that it can swing down and lie parallel to the base frame 16, see FIGS. 5 and 6. It is to be noted that the pivot pins 58 and 60 are higher above the base frame than pivot pins 54 and 56. In this way, the back lower end frame is first folded down against the base frame, and then the front lower end frame is folded down over, parallel to, and in contact with the back lower end frame, as seen in FIG. 5. In this way, a compact structure is achieved. When in the raised position, the stops, of which stop 36 is an example, limit the raising of the lower end frames to a position where they are each at a right angle with respect to the base frame.

Casters are installed in the lower ends of the tubes of the lower end frames. Casters 62, 64, 66 and 68 are respectively mounted in the lower ends of tubes 42 through 48. When the lower end frames are in their erected position, the casters are below the base frame so that it is supported on the casters. When the lower end frames are in the folded position, the casters are at the ends of the folded cart so that it may be trundled along like a two-wheel device.

Front and back upper end frames 70 and 72 are each U-shaped, with the arms thereof directed downwardly when the cart is erected. Arms 74 and 76 respectively telescopically engage in tubes 42 and 44. Arms 78 and 80 respectively engage in tubes 46 and 48. Cross pieces 82 and 84 respectively join the tops of the arms. The upper end frames are raised in FIGS. 1 and 8 and are telescopically lowered in FIG. 7. FIG. 2 shows spring detent 86 in arm 78 engaging through a detent hole in tube 46. The lower end of the tube also has a hole to receive the spring detent 86 in order to hold the upper end frames in their telescoped down position. The detent and hole are arranged to releasably hold the end frames in the raised position. Four of such detents are preferably provided, one in each of the arms of the upper end frames. When the collapsible cart is folded, as shown in FIG. 5, the telescoping upper end frames slide into the lower end frames sufficiently far that the cross pieces 82 and 84 are inward of the stops on pivot brackets 24 through 30. When in the fully folded position, at least the upper end frame 70 is pulled out so that it engages under stop 36 and the companion stop across the cart on pivot bracket 26, as seen in FIGS. 5 and 6. This holds the cart in the folded position shown in FIGS. 5 and 6.

Figure 8:
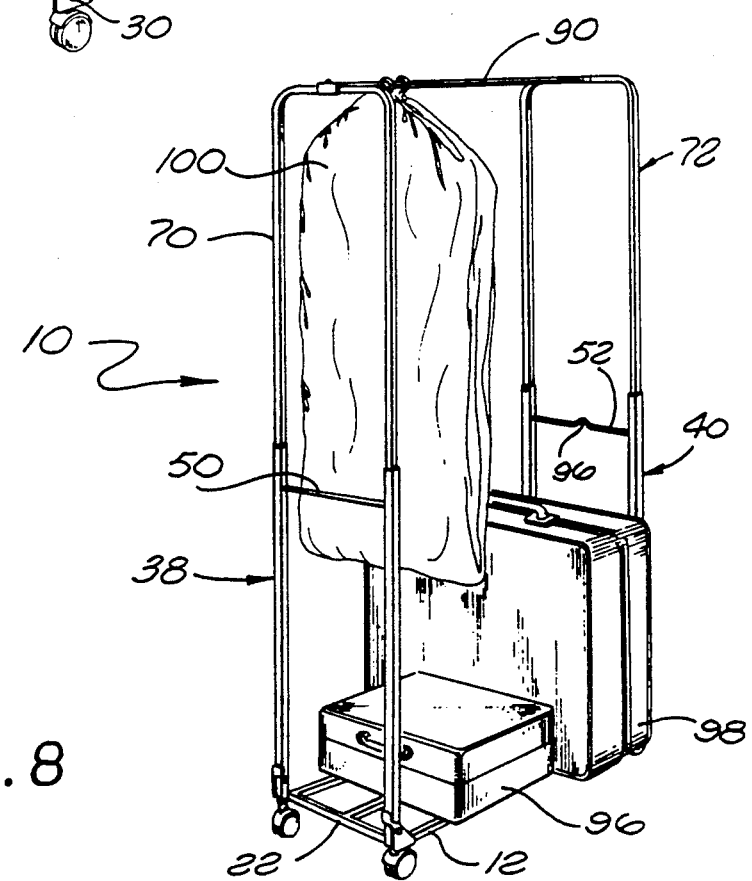
FIG. 8 is a view similar to FIG. 1 showing the manner in which the collapsible cart carries baggage thereon.

Upper end frame 72 has a rotating section 88 (see FIGS. 4 and 6) that is rotating within the length of cross piece 84. Hanging bar 90 is secured to the rotating section. The hanging bar 90 can be raised from the pendant position shown in FIG. 7 to the raised, horizontal position shown in FIG. 1 by rotation of the section 88. Yoke 92 is mounted on the end of hanging bar 90, as seen in FIG. 3. The yoke is placed over the cross piece 82 of upper end frame 70, as shown in FIG. 3. Pin 94 on the top of cross piece 82 engages through a corresponding hole in the yoke 92 to hold the yoke in place. When the upper end frames and the hanging bar are in the raised position, as shown in FIGS. 1 and 8, the hanging bar is suitable for travel c with hanging hooks thereon. When lowered, the hanging bar 90 occupies recess 96 in cross brace 52, as seen in FIG. 7.

When the cart 10 is in its folded position, as shown in FIGS. 5 and 6, it can be readily carried in the hand, usually in the horizontal position, with the hand wrapped around the right side tubes 44 and 48 and right rail 16. The hanging bar 90 lies through the center space between the tubes 46 and 48 of back lower end frame 40. When it is desired to erect the cart, the upper end frame 70 is moved in the telescoping closed direction to release the upper part of the front end frame 70 from underneath the stops 36. The front end frame 38 is then pivoted to its upright position, shown in FIG. 7. The back end frame 40 is also pivoted to its raised position, as shown. Next, the telescoping upper end frames are raised to the detent position. Thereafter, hanging bar 90 is raised to engage over pin 94. This is the status shown in FIGS. 1 and 8, and the erected cart is ready to receive the materials which it will support and transport, usually travel baggage. In FIG. 8, it is shown as carrying travel cases 96 and 98 of various sizes on its base frame and is shown as carrying hanging case 100 depending from its hanging bar 90. The cart 10 can carry these materials to the desired destination, the cases can be removed, and the cart can then be folded into its collapsed position, shown in FIGS. 5 and 6. The cart 10 is, thus, capable of carrying various loads on four wheels, including hanging cases, and is capable of being folded into a compact cart which can be carried along with the baggage in the compact condition.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A collapsible garment cart comprising:
   a base frame, said base frame having first and second ends;
   a first end frame pivotally mounted on said base frame at said first end thereof so that said first end frame can be folded down to lie against said base frame and can be moved to a raised position wherein said first end frame is at substantially a right angle with respect to said base frame;
   a second end frame pivotally mounted to said base frame at said second end thereof so that said second end frame has a lowered position wherein it lies against said first end frame when said first end frame is lying against said base frame and a raised position wherein said second end frame is at substantially a right angle with respect to said base frame;
   wheels mounted on said end frames and below said base frame so that, when said end frames are in a raised position, materials can be placed on said base frame between said end frames to be supported and transported on said vehicle;
   first and second telescoping end frames respectively telescopically mounted in said first and second end frames so that said and second telescoping end frames may be telescoped to a raised position when said first and second end frames are in a raised position;
   a hanging bar and means for attaching said hanging bar to said first and second telescoping end frames so that said hanging bar rests substantially parallel to said base frame and inhibits said first and second end frames from moving toward their folding position;
   a plurality of stops, said stops interengaging between said base frame and said end frames to limit said end frames to being raised substantially to a position at a right angle with respect to said base frame, said stops being positioned so that at least one of said telescoping end frames can engage thereunder when said end frames are in their folded position so as to releasably retain said first and second end frames in their folded position.

2. The collapsible cart of claim 1 wherein said wheels are mounted on said end frames so that said wheels are below said base frame when said first and second end frames are in their raised position.

3. The collapsible cart of claim 2 wherein there are four wheels, at least two of said wheels being casters.

4. A collapsible garment cart comprising:
a base frame, said base frame having first and second ends;
first and second end frames, means respectively pivoting said first and second end frames on said first and second ends of said base frame so that said first end frame can be pivoted from a raised position away from said base frame to a folded position wherein it lies against said base frame and said second end frame can be pivoted from a raised position to a folded position wherein it lies against said first end frame so that first and second end frames lie compactly next to said base frame in the folded position;
first and second wheels attached to each of said first and second end frames, said wheels being positioned so that, when said first and second end frames are raised, said wheels are below said base frame for support and movement of said base frame;
stops interengaging between said end frames and said base frame for releasably retaining said end frames in their folded position and for limiting the unfolding pivot of said first and second end frames with respect to said base;
first and second telescoping end frames respectively telescopically engaged with said first and second end frames so that said telescoping end frames can be raised above said first and second end frames;
a hanging bar interconnecting said telescoping end frames when said first and second end frames are in their raised position, said hanging bar being pivotally attached to said first telescoping end frame and detachably connected to said second telescoping end frame so that said telescoping end frames can be telescoped into said first and second end frames and said hanging bar can lie adjacent said first telescoping end frame so that said telescoping end frames and said hanging bar can also be compactly folded with respect to said base; and
said stops include a stop under which at least one of said telescoping end frames engages to releasably retain both said telescoping end frames and said first and second end frames with respect to said base.

5. The collapsible cart of claim 4 wherein said stops limit the unfolding position of said first and second end frames to substantially a right angle with respect to said base frame.

6. The collapsible cart of claim 4 wherein a detent interengages between said telescoping end frame and said first end frame to releasably retain said telescoping end frame in raised position.

7. A collapsible garment cart comprising:
a base frame, said base frame having first and second ends;
first and second end frames, means respectively pivoting said first and second end frames on said first and second ends of said base frame so that said first end frame can be pivoted from a raised position away from said base frame to a folded position wherein it lies against said base frame and said second end frame can be pivoted from a raised position to a folded position wherein it lies against said first end frame so that said first and second end frames lie compactly next to said base frame when in the folded position;
first and second wheels attached to each of said first and second end frames, said wheels being positioned so that, when said first and second end frames are raised, said wheels are below said base frame for support and movement of said base frame;
stops interengaging between said end frames and said base frame for releasably retaining said end frames in their folded position and for limiting the unfolding pivot of said first and second end frames with respect to said base;
first and second telescoping end frames respectively telescopingly mounted on said first and second end frames;
a hanging bar pivotally mounted on said first telescoping end frame and detachably mountable on said second telescoping end frame to releasably retain said first and second end frames in raised position and to support a hanging case above said base; and
said means for pivoting said first and second end frames on said base frame including a stop under which one of said telescoping end frames can be engaged when said telescoping end frames are telescoped into said end frames to releasably retain said frames in folded position.

8. The collapsible cart of claim 7 wherein said wheels are mounted in said end frames so that said wheels are below said base frame when said end frames are in their unfolded position.

9. The collapsible car of claim 8 wherein at least two of said wheels are casters.

* * * * *